(12) United States Patent
Hoechst et al.

(10) Patent No.: US 11,125,368 B2
(45) Date of Patent: Sep. 21, 2021

(54) CONDUIT CONNECTOR AND METHOD OF CONSTRUCTION THEREOF

(71) Applicant: Miniature Precision Components, Inc., Walworth, WI (US)

(72) Inventors: Dane J. Hoechst, Elkhorn, WI (US); Joel Culbertson, Elkhorn, WI (US); C. J. Garecht, Janesville, WI (US); Akshay Hoskote, Delavan, WI (US)

(73) Assignee: NOVARES US ENGINE COMPONENTS, INC., Walworth, WI (US)

( * ) Notice: Subject to any disclaimer, the term of this patent is extended or adjusted under 35 U.S.C. 154(b) by 824 days.

(21) Appl. No.: 15/831,538

(22) Filed: Dec. 5, 2017

(65) Prior Publication Data
US 2018/0156370 A1 Jun. 7, 2018

Related U.S. Application Data

(60) Provisional application No. 62/430,969, filed on Dec. 7, 2016.

(51) Int. Cl.
*F16L 33/30* (2006.01)
*F16L 37/02* (2006.01)
(Continued)

(52) U.S. Cl.
CPC .......... *F16L 37/025* (2013.01); *B29C 33/005* (2013.01); *B29C 45/261* (2013.01);
(Continued)

(58) Field of Classification Search
CPC ......... F16L 37/025; F16L 33/22; F16L 33/30; F16L 33/20; B29C 45/261; B29C 45/2612; B29C 33/005; B29L 2031/24
See application file for complete search history.

(56) References Cited

U.S. PATENT DOCUMENTS 3,275,349 A * 9/1966 Chovan .................. F16L 33/02
 285/252
5,329,406 A 7/1994 Nakanishi et al.
(Continued)

FOREIGN PATENT DOCUMENTS

DE 2845308 A1 * 4/1980 ......... B29C 45/1676
DE 2936141 * 3/1981

OTHER PUBLICATIONS

International Search Report and Written Opinion dated Mar. 20, 2018 in corresponding PCT International Patent Application No. PCT/US2017/064987.

*Primary Examiner* — Matthew Troutman
*Assistant Examiner* — James A Linford
(74) *Attorney, Agent, or Firm* — Dickinson Wright PLLC

(57) ABSTRACT

A conduit connector and method of construction thereof is provided. The conduit connector includes a body having a through passage extending between open opposite ends and a tubular male port section extending axially to an end face of one of the ends. The tubular male section has an outer surface configured for connection to a tubular conduit and an inner surface bounding at least a portion of the through passage. The end face has an outer annular first surface extending radially inwardly from the outer surface and an inner annular second surface extending radially inwardly from the annular first surface toward the inner surface. The annular second surface forms a counterbore that is recessed axially a first distance from the annular first surface, wherein an annular bead extends from one of the annular second surface or the inner surface, with the entirety of the annular bead remaining recessed below the annular first surface.

20 Claims, 6 Drawing Sheets

(51) Int. Cl.
  *B29C 45/26* (2006.01)
  *B29C 33/00* (2006.01)
  *F16L 33/22* (2006.01)
  *F16L 33/20* (2006.01)
  *B29C 45/36* (2006.01)
  *B29L 31/24* (2006.01)

(52) U.S. Cl.
  CPC .......... *B29C 45/2612* (2013.01); *F16L 33/20* (2013.01); *F16L 33/22* (2013.01); *F16L 33/30* (2013.01); *B29C 2045/363* (2013.01); *B29L 2031/24* (2013.01)

(56) References Cited

U.S. PATENT DOCUMENTS

| | | |
|---|---|---|
| 2006/0088374 A1 | 4/2006 | Nishiyama et al. |
| 2006/0099298 A1 | 5/2006 | Hayes et al. |
| 2011/0175348 A1 | 7/2011 | Bogert et al. |

* cited by examiner

CONDUIT CONNECTOR AND METHOD OF CONSTRUCTION THEREOF

CROSS REFERENCE TO RELATED APPLICATION

This application claims the benefit of and priority to U.S. Provisional Application Ser. No. 62/430,969 filed Dec. 7, 2016. The disclosure of the above application is incorporated by reference herein as if fully set forth in its entirety.

BACKGROUND OF THE INVENTION

Field of the Invention

The present disclosure relates generally to a connector for operable connection of a tubular conduit to a flow path, and more particularly to a molded tubular connector for attachment of a tubular conduit to a flow path and method of construction thereof.

Related Art

This section provides background information related to the present disclosure which is not necessarily prior art.

As is well known, tubular connectors, also referred to as conduit connectors, are commonly used to allow quick and simple connection of tubes or tubular conduits to one another or to a flow path in general. Such tubular connectors are commonly used in a variety of liquid and gas systems, to provide operable connection of a tubular conduit to a liquid or gas flow path/conduit for establishing a leak proof flow path therebetween. For example, in automotive applications, tubular conduit connectors are commonly used in various air/vapor/fluid management systems, such as in coolant systems, and more particularly for attachment of radiator hose to thermostat housing and/or to an engine block, for example. Of course, many other fluid/gas connections requiring tubular connectors to couple hoses to one another and to couple hoses to other vehicle components exist within engine systems.

In order to ensure fluid/gas leaks are not present in the fluid/gas conveying system upon assembly, such conduit connectors, upon being attached to the associated fluid/gas flow path, are commonly tested during assembly/manufacture by being connected to a pressure testing fixture/apparatus/system. It is known to establish a connection during testing by pressing an end face of the conduit connector against a seal member of the pressure test fixture/apparatus/system to establish a fluid/gas tight seal therebetween, and then perform the pressure test. Unfortunately, test results can turn up false negatives, indicating a leak exists within the fluid/gas circuit, when in actuality, the fluid/gas circuit does not contain a leak. The false indication of a leak results in unnecessary costs, such as through scrapping of an otherwise good part(s), or spending time reworking an otherwise good part(s). A significant source of such false negatives can result from the configuration of the conduit connector.

When conducting the aforementioned leak test, while pressing the end face of the conduit connector against the seal member of the pressure test fixture/apparatus/system, a leak can result therebetween, thereby resulting in a false negative test. As shown in FIG. 1, known conduit connectors 1 have a through passage 2 extending along a longitudinal axis A between opposite open ends 3, 4, with one end 3 being configured for attachment to a vehicle component, such as to a mounting surface or member providing an inlet/outlet port of an engine cooling system (not shown), and the opposite end 4 being configured for attachment to a tubular conduit 5. The end 4 has an end face 6 and a generally cylindrical male port section having an annular outer periphery 7, wherein the outer periphery 7 typically has at least one annular rib 8 sized for an interference fit within the conduit 5, wherein a hose clamp or the like (not shown) can be used to facilitate maintaining a leak proof connection therebetween. The end face 6 extends from a generally cylindrical inner surface 9 of the through passage 2 to the outer periphery 7, wherein the end face 6 is typically formed as a substantially flat, planar surface. However, in manufacture, as shown in FIG. 1A, an inner core 10 and outer mold 11 form a cavity 12 for receipt of molten plastic or metallic material, and when injecting the molten material into the cavity 12, flashing is typically formed at a parting line PL between the inner core 9 and mold 10. The flashing forms an annular flashing bead or protrusion 13 at the parting line PL which extends annularly about a transition region of the end face 6 to the inner surface 9 of the through passage 2, wherein the flashing protrusion 13 extends axially, relative to the axis A, upwardly and outwardly from the end face 6 a distance (d). The flashing protrusion 13 generally forms a relatively sharp, exposed free edge 14 that presents potential problems for both handling and pressure testing during assembly/manufacture. The handling problem arises from the sharp edge 14 providing a source for potential cuts while handling the connector 1, while the testing problem arises while seating the end face 6 against the seal member (not shown) of the pressure test fixture/apparatus/system during pressure testing. The sharp edge 14, given it extends axially beyond the end face 6, can abrade or otherwise cut and cause wear to the seal member, and particularly over multiple tests as occurs in a manufacture facility. The worn seal member ultimately diminishes the ability of the seal member to form a reliable seal against the end face 6. As such, over time, the integrity of the pressure test fixture/apparatus/system results can be compromised, resulting in potential false negatives, which in turn can result in the connector and/or fluid/gas system being reworked or scrapped. In addition to the forgoing problems, further attention is needed to replace the seal member as it becomes damaged by the sharp free edge 14 of the flashing 13, thus resulting in further costs associated with manufacture. In some cases, as a result of the aforementioned problems, upon forming the connector 1, it is further known to perform secondary operations to remove the sharp free edge 14; however, this results in a further problem of added cost associated with manufacture of the connector 1.

A conduit connector constructed in accordance with the present disclosure, and assembly therewith, overcomes at least those the problems discussed above, and likely others, which will become readily apparent to one skilled in the art upon viewing the entirety of the disclosure herein.

SUMMARY OF THE INVENTION

This section provides a general summary of the disclosure and is not intended to represent a comprehensive summary of all of its features, advantages, aspect and/or objectives.

It is an aspect of the present disclosure to provide an improved conduit connector and method of construction thereof. The conduit connector and method of construction thereof includes forming the connector having a tubular male port section configured for attachment of a tubular conduit thereto, wherein the male port section terminates at an end face that is free of flashing extending axially outwardly therefrom to a terminus. As such, the improved conduit connector reduces the potential for scraping and cutting hands of a worker while handling the connector during manufacture, and enhances obtaining accurate results while pressure testing of a fluid/gas system containing the connector by reducing the likelihood for false negatives (leaks) within the system.

A conduit connector, constructed in accordance with one aspect of the disclosure, includes a body having a through passage extending between opposite open ends and having a tubular male port section extending axially to an end face of one of the opposite ends. The tubular male section has an outer surface configured for receipt of a tubular conduit and an inner surface bounding at least a portion of the through passage. The end face extends radially from the outer surface to the inner surface, having an annular first surface extending radially inwardly from the outer surface and an annular second surface extending radially inwardly from the annular first surface toward the inner surface. The annular second surface forms a counterbore recessed axially a first distance from the annular first surface, wherein an annular bead extends from one of the annular second surface or the inner surface, with the annular bead remaining recessed below the annular first surface.

In accordance with another aspect of the invention, the annular bead can extend axially from the annular second surface a second distance, wherein the second distance is less than the first distance.

In accordance with another aspect of the invention, the annular bead can be formed immediately adjacent the inner surface.

In accordance with another aspect of the invention, the annular bead can extend radially inwardly from the inner surface.

In accordance with another aspect of the invention, a method of constructing a conduit connector is provided. The method includes molding a body having a through passage extending between opposite open ends and having a tubular male port section extending axially to an end face of one of the opposite ends. Further, forming the tubular male section having an outer surface configured for receipt of a tubular conduit and an inner surface bounding at least a portion of the through passage. Further yet, forming the end face having an annular first surface extending radially inwardly from the outer surface and forming an annular second surface extending radially inwardly from the annular first surface toward the inner surface, with the annular second surface forming a counterbore recessed axially a first distance from the annular first surface. Further, forming an annular bead of flashing extending either from the annular second surface or the inner surface, with the entirety of the annular bead remaining recessed below the annular first surface.

In accordance with another aspect of the invention, the method of constructing the conduit connector can include forming the annular bead extending axially from the second surface a second distance, with the second distance being less than the first distance.

In accordance with another aspect of the invention, the method of constructing the conduit connector can include forming the annular bead immediately adjacent the inner surface.

In accordance with another aspect of the invention, the method of constructing the conduit connector can include forming the annular bead extending radially inwardly from the inner surface.

In accordance with another aspect of the invention, the method of constructing the conduit connector can include forming the body in a molding process including an inner core and an outer mold.

In accordance with another aspect of the invention, the method of constructing the conduit connector can include forming the inner surface with an inner core including an upper core section and a lower core section with the upper and lower core sections being moveable axially away from one another.

In accordance with another aspect of the invention, the method of constructing the conduit connector can include forming the outer surface and the end face with a one piece outer mold and forming the inner surface with an inner core, wherein the outer mold and the inner core are moveable relative to one another.

Further areas of applicability of the present invention will become apparent from the description and illustrations provided herein. The description and specific examples in this summary are intended for purposes of illustration only and are not intended to limit the scope of the present disclosure.

BRIEF DESCRIPTION OF THE DRAWINGS

These and other aspects, features and advantages of the invention will become more readily appreciated when considered in connection with the following detailed description, appended claims and accompanying drawings, in which:

DETAILED DESCRIPTION OF PRESENTLY PREFERRED EMBODIMENTS

Figure 1:
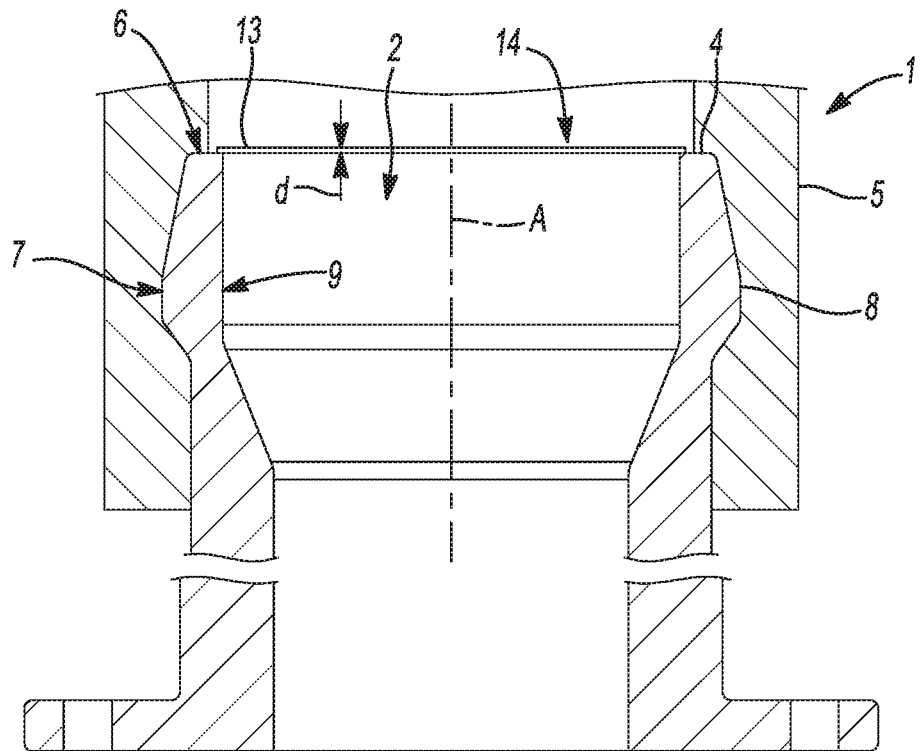
FIG. 1 is cross-sectional side view of a conduit connector with conduit attached thereto in accordance with the prior art.
Figure 1A:
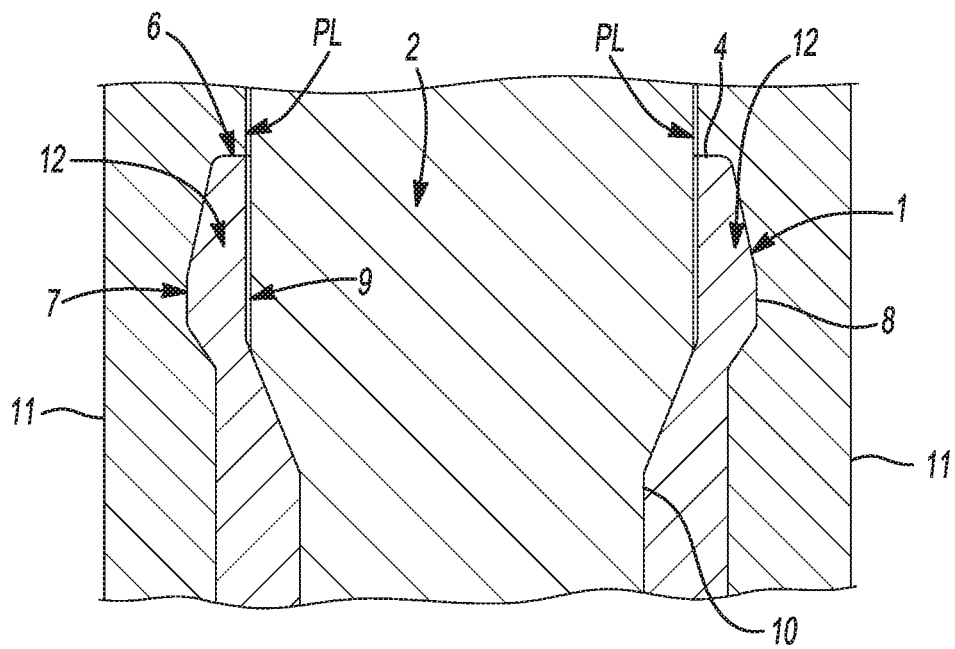
FIG. 1A is a cross-sectional fragmentary view illustrating a molding process and mold used to construct the conduit connector of FIG. 1.
Figure 1B:
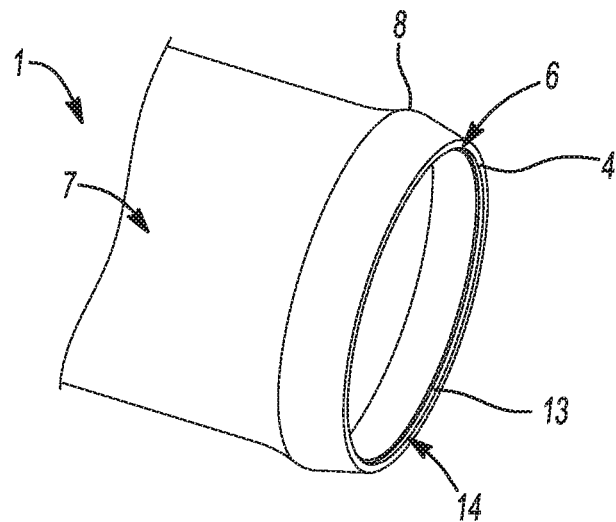
FIG. 1B is a fragmentary perspective view of the conduit connector of FIG. 1.

Referring in general to all of the Figures, the present disclosure and teachings described herein are directed to conduit connectors and assemblies therewith, of the type particularly well-suited for providing a fluid/gas tight connection (union) between tubular conduits forming fluid/gas flow paths or circuits. While disclosed in accordance with one or more specific exemplary constructions, a conduit connector, wherein a first embodiment is identified by reference numeral 20 and additional embodiments and features thereof are identified by the same reference numerals, offset by factors of 100's, and method of construction thereof of the present disclosure may be configured and performed other than as expressly shown and described. The inventive concepts disclosed herein are generally directed to an improved conduit connector for forming and ensuring a reliable, fluid/gas-tight connection is made between a tubular male port of the connector and a tubular conduit/passage; to ensuring pressure testing of a fluid/gas system containing the conduit connector does not result in false negatives (meaning a leak is indicated in an otherwise leak-free fluid/gas system), and further to improving handling of the conduit connector during manufacture and assembly by reducing the likelihood of cuts to a worker during handling. Accordingly, as least some of the benefits derived from the improved conduit connector include the avoidance of reworking good parts; the avoidance of scrapping good parts; the avoidance of damage to a seal member of a pressure test apparatus, thereby eliminating the downtime, replacement and repair costs associated therewith; and the avoidance of injury and costly downtime to a worker.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "compromises," "comprising," "including," and "having," are inclusive and therefore specify the presence of stated features, integers, steps, operations, elements, and/or components, but do not preclude the presence or addition of one or more other features, integers, steps operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below, as would be recognized through use of common sense. The device may be otherwise oriented (rotated 90 degrees or at other orientations) and the spatially relative descriptors used herein interpreted accordingly.

Figure 2:
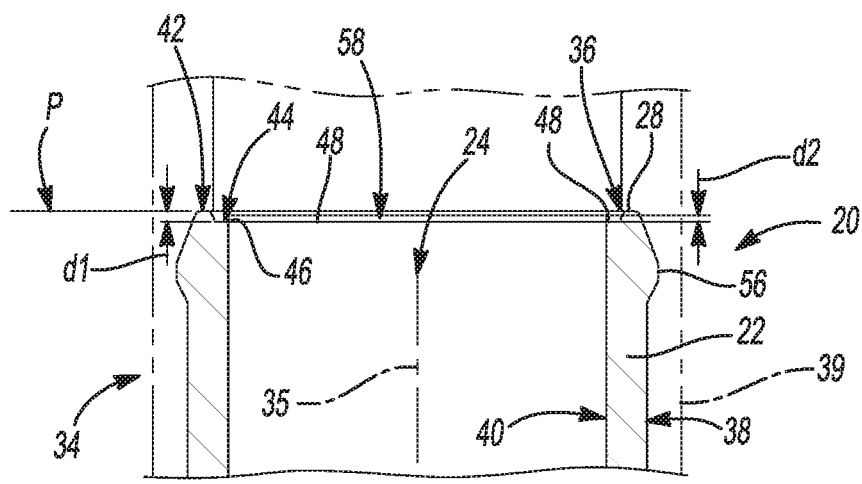
FIG. 2 is a cross-sectional fragmentary side view of a conduit connector constructed in accordance with one aspect of the disclosure.
Figure 2A:
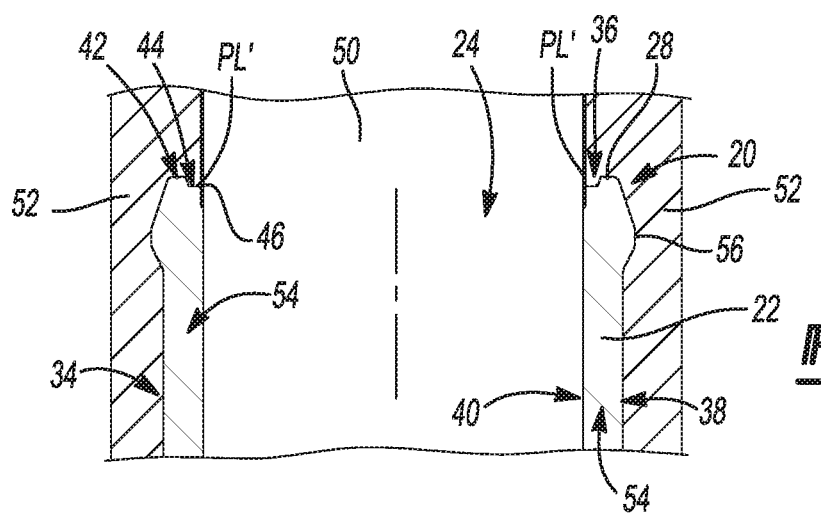
FIG. 2A is a cross-sectional fragmentary view illustrating a molding process and mold used to construct the conduit connector of FIG. 2.
Figure 2B:
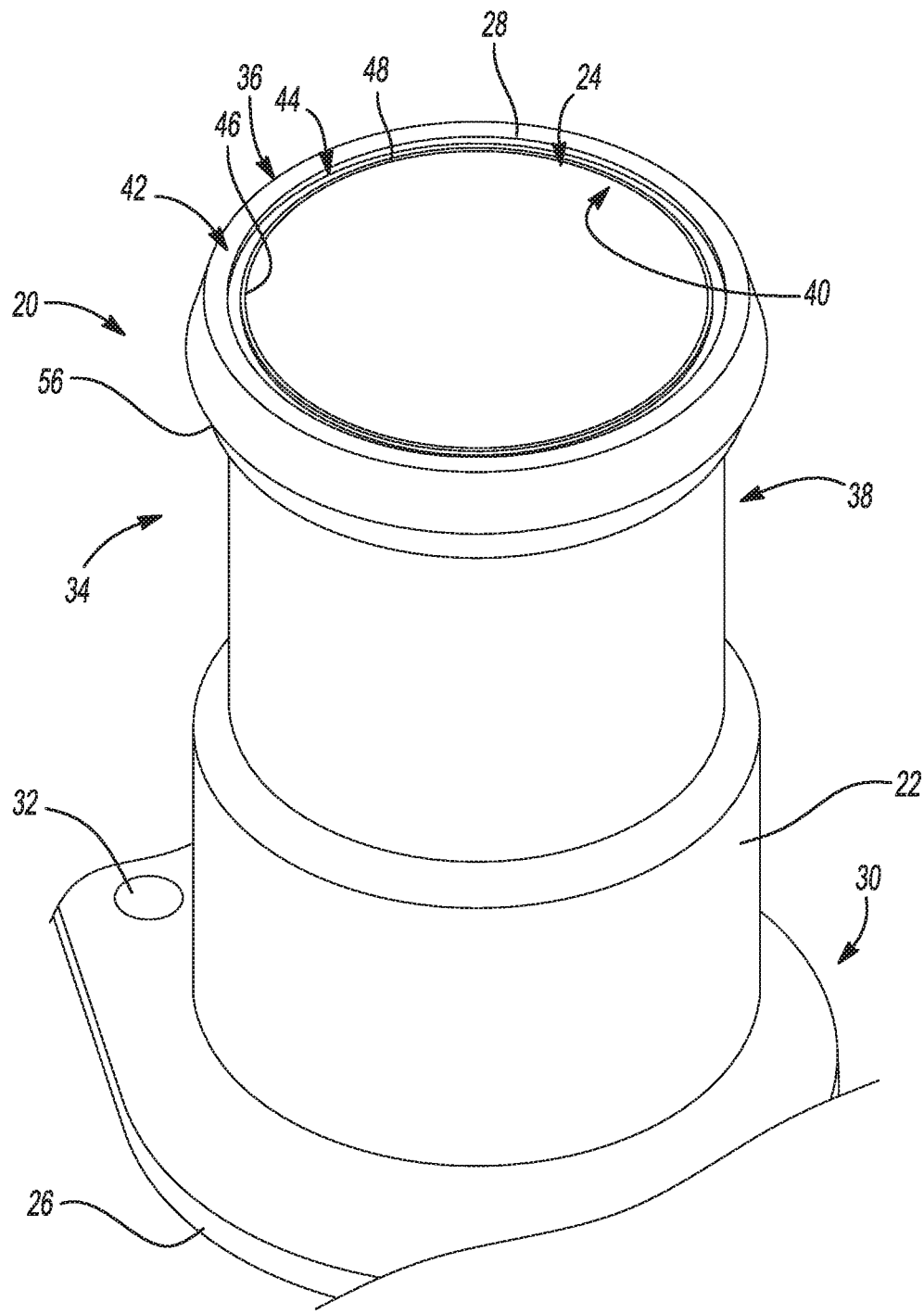
FIG. 2B is a fragmentary perspective view of the conduit connector of FIG. 2 with an end of a paper clip shown touching a region formed by a parting line of the mold of FIG. 2A.

In accordance with one aspect of the disclosure, the connector 20 includes a body 22 having a through passage 24 extending between opposite open ends 26, 28. As shown in FIG. 2B, the body 22 provides a mount flange section 30 having fastener openings 32 at one of the ends 26 to facilitate attaching the connector 20 to the desired mount surface, such as to a portion of a vehicle engine, e.g. coolant inlet/outlet, or component thereof (not shown). The body 22 further provides a tubular male port section 34 extending axially along an axis 35 (FIG. 2) away from the mount flange section 30 to an end face 36 at the opposite end 28. The tubular male port section 34 has an outer surface 38 configured for receipt of a tubular conduit 39 thereabout and an inner surface 40 bounding at least a portion of the through passage 24. The end face 36 extends radially from the outer surface 38 to the inner surface 40. The end face 36 has at least two distinct annular sections, shown as having an annular first surface 42 extending radially inwardly directly from the outer surface 38 and an annular second surface 44 extending radially inwardly directly from the first surface 42 toward the inner surface 40, and shown as extending to the inner surface 40, such the that inner surface 40 transitions (at an annular transition region) to the inner surface 40 at a corner edge 46. The annular second surface 44 forms a counterbore recessed axially a first distance (d1) from the annular first surface 42. In manufacture, as discussed further below, a raised annular flashing bead, also referred to as protrusion or bead 48 is formed, with the bead 48 extending axially from the annular second surface 44 a second distance (d2), wherein the second distance d2 is less than the first distance d1. Accordingly, the bead 48 remains, in its entirety, recessed below a plane (P) defined by the planar or substantially planar first surface 42, thereby improving handling and pressure testing during assembly.

The body 22 can be formed of any desired moldable material, including polymeric or metallic materials. In manufacture, as shown in FIG. 2A, an inner core 50 and outer mold 52 form a cavity 54 for receipt of molten material. The molten material flows throughout the cavity 54 to form the desired shaped of the body 22, and thus, intricate features can be readily formed, including one or more annular ribs 56 to facilitate retention of the conduit 39 in leak-proof fashion. During molding, flashing is formed at a parting line PL' between the inner core 50 and outer mold 52. The flashing forms the annular bead 48, with the bead 48 being located in the transition region of the end face 36 to the inner surface 40 of the through passage 24. The bead 48, as shown, extends axially relative to the axis 35 directly from the second surface 44 adjacent or immediately adjacent the inner surface 40.

The bead 48 extends to an annular free edge 58, with the axial length d2 of the bead 48 being defined as extending from the second surface 44 to the free edge 58. With the axial height d2 of the bead 48 being less than the recessed depth d1 of the second surface 44, the free edge 58 of the bead 48 is assured of remaining recessed below the plane P of the end face first surface 42.

In manufacture and assembly, in accordance with another aspect of the disclosure, a method of constructing a conduit connector 20 is provided. The method includes the aforementioned steps, including, molding a body 22 of any desired moldable material having a through passage 22 extending between opposite open ends 26, 28, with the body 22 being formed having a tubular male port section 34 extending axially to an end face 36 of one of the opposite ends 28. Further, the method includes forming the tubular male section 34 having an outer surface 38 configured for receipt of a tubular conduit 39 and an inner surface 40 bounding at least a portion of the through passage 24. The method further includes forming the end face 36 having an annular first surface 42 extending radially inwardly from the outer surface 38 and forming an annular second surface 44 extending radially inwardly from the annular first surface 42 toward the inner surface 40, with the annular second surface 44 being formed as a counterbore recessed axially a first distance (d1) from the annular first surface 42. Further yet, while forming the body 22, the method includes forming a raised annular bead of flashing 48 extending axially from the annular second surface 44 a second distance d2, with the second distance d2 being formed as being less than the first distance d1. In accordance with a further aspect of the method, the method can include forming the raised annular bead of flashing 48 either adjacent or immediately adjacent the inner surface.

During assembly of the connector 20 to the desired vehicle component, the connector 20 and flow path formed therewith can be readily pressure tested without concern of generating false negatives. The pressure testing is assured of being accurate and reliable due to the bead of flashing 48 having a height recessed from the plane P defined by the first surface 42 of the end face 36. As such, during pressure testing, the first surface 42 can be placed into sealed abutment with a seal member of a pressure test system (not shown) without concern of the bead of flashing 48 causing damage to, or otherwise negatively impacting the integrity of a fluid/gas tight seal between the connector 20 and the pressure test system. Accordingly, the pressure test results are reliable, thereby negating the potential for false results, and thus, avoiding costly expense of reworking or scrapping good parts, and also avoiding damage to the seal member of the pressure test system.

Figure 3:
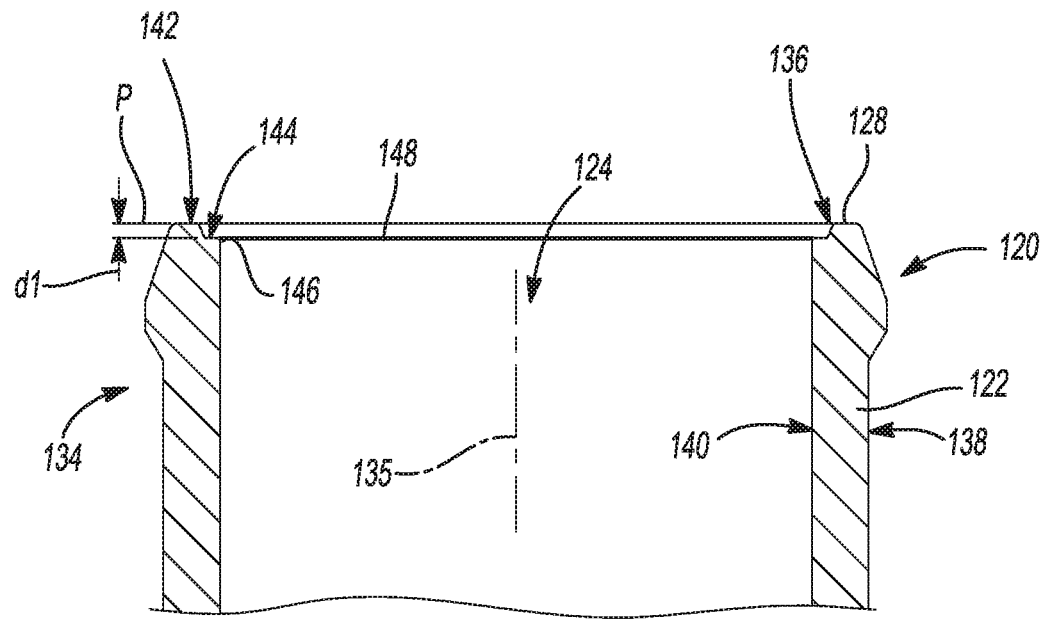
FIG. 3 is a cross-sectional fragmentary side view of a conduit connector constructed in accordance with another aspect of the disclosure.

In FIG. 3, a connector 120 constructed in accordance with another aspect of the disclosure is shown, wherein the same reference numerals as used above, offset by a factor of 100, are used to identify like features. The connector 120 includes a body 122 having a through passage 124 extending between opposite open ends (one shown, 128). The body 122 further provides a tubular male port section 134 extending axially along an axis 135 to an end face 136 opposite a mounting flange end (not shown, but the same or similar to that described for FIG. 2B). The tubular male port section 134 has an outer surface 138 configured for receipt of a tubular conduit thereabout and an inner surface 140 bounding at least a portion of the through passage 124. The end face 136 has at least two distinct annular sections, shown as having an annular first surface 142 extending radially inwardly directly from the outer surface 138 and an annular second surface 144 extending radially inwardly directly from the first surface 142 to the inner surface 140, such the that inner surface 140 transitions to the inner surface 140 at a corner edge 146. The annular second surface 144 is recessed axially a first distance (d1) from the annular first surface 142. In manufacture, an annular flashing bead, also referred to as protrusion or bead 148 is formed, with the bead 148 extending radially inwardly from the inner surface 140, wherein the bead 148 remains, in its entirety, recessed below a plane (P) defined by the planar or substantially planar first surface 142, thereby improving handling and pressure testing during assembly.

Figure 3A:
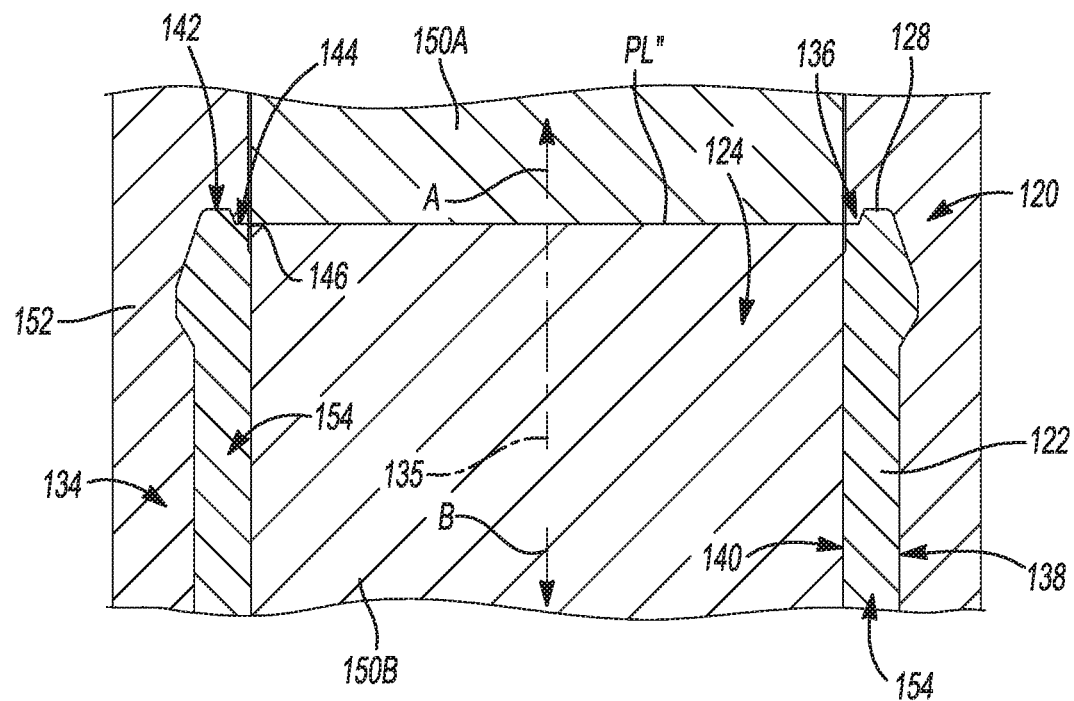
FIG. 3A is a cross-sectional fragmentary view illustrating a molding process and mold used to construct the conduit connector of FIG. 3A.

In manufacture, as shown in FIG. 3A, an inner core, including a first inner core section 150A and a second inner core section 150B, and outer mold 152 form a cavity 154 for receipt of molten material. The inner core section 150A and a second inner core section 150B abut one another at a PL" that extends radially in transverse relation to the axis 135 in coplanar or substantially coplanar relation with the second surface 144. During molding, the molten material flows throughout the cavity 154 to form the desired shaped of the body 122, wherein flashing can be formed at the parting line PL" between the first and second inner core sections 150A, 150B. The flashing forms the annular bead 148, with the bead 148 being located at the transition region of the end face 136 to the inner surface 140 of the through passage 124. The bead 148, as shown, extends radially inwardly from the inner surface 140 adjacent or immediately adjacent the transition corner edge 146 toward the axis 135. Accordingly, with the bead 148 extending radially inwardly toward the axis 135 adjacent or below the second surface 144, the bead 148, in its entirety, remains recessed below the plane P of the first surface 142. After molding, the inner core section 150A and a second inner core section 150B can be withdrawn away from one another along respective directions indicated by arrows A, B.

Figure 4:
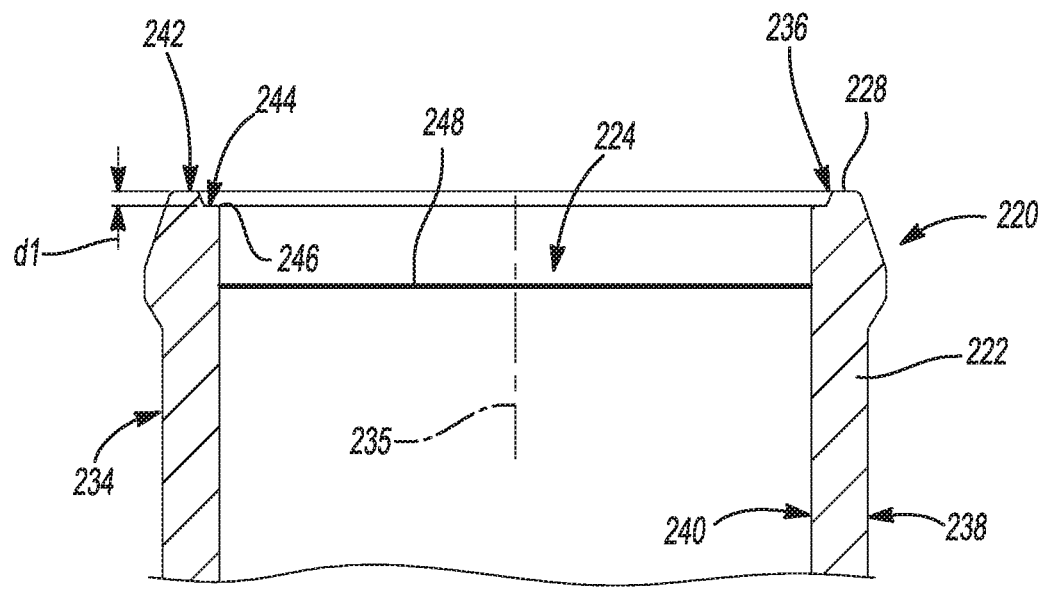
FIG. 4 is a cross-sectional fragmentary side view of a conduit connector constructed in accordance with another aspect of the disclosure.

In FIG. 4, a connector 220 constructed in accordance with another aspect of the disclosure is shown, wherein the same reference numerals as used above, offset by a factor of 200, are used to identify like features. The connector 220 includes a body 222 having a through passage 224 extending between opposite open ends (one end shown, 228). The body 222 further provides a tubular male port section 234 extending axially along an axis 235 to an end face 236 opposite a mounting flange end (not shown, but the same or similar to that described for FIG. 2B). The tubular male port section 234 has an outer surface 238 configured for receipt of a tubular conduit thereabout and an inner surface 240 bounding at least a portion of the through passage 224. The end face 236 has at least two distinct annular sections, shown as having an annular first surface 242 extending radially inwardly directly from the outer surface 238 and an annular second surface 244 extending radially inwardly directly from the first surface 242 to the inner surface 240, such the that inner surface 240 transitions to the inner surface 240 at a corner edge 246. The annular second surface 244 is recessed axially a first distance (d1) from the annular first surface 242. In manufacture, an annular flashing bead, also referred to as protrusion or bead 248 is formed, with the bead 248 extending radially inwardly from the inner surface 240, wherein the bead 248 remains, in its entirety, recessed below a plane (P) defined by the planar or substantially planar first surface 242, thereby improving handling and pressure testing during assembly.

Figure 4A:
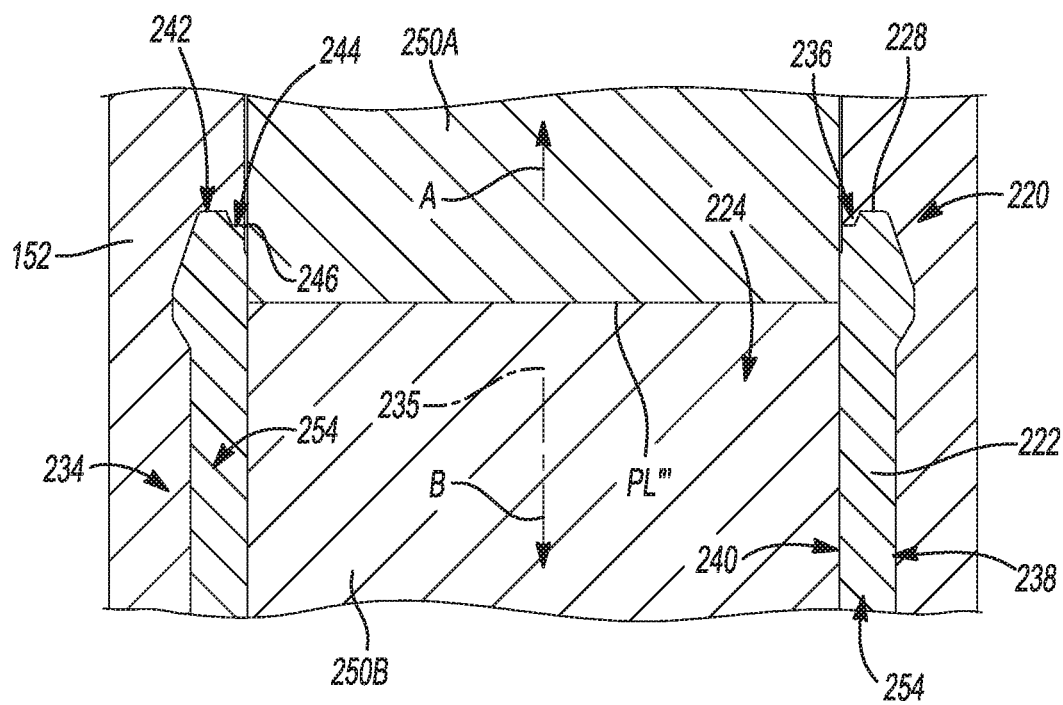
FIG. 4A is a cross-sectional fragmentary view illustrating a molding process and mold used to construct the conduit connector of FIG. 4.

In manufacture, as shown in FIG. 4A, an inner core, including a first inner core section 250A and a second inner core section 250B, and outer mold 252 form a cavity 254 for receipt of molten material. The inner core section 250A and a second inner core section 250B abut one another at a parting line Pr that extends radially in transverse relation to the axis 235 below the second surface 244. During molding, the molten material flows throughout the cavity 254 to form the desired shaped of the body 222, wherein flashing can be formed at the parting line PL''' between the first and second inner core sections 250A, 250B. The flashing forms the annular bead 248, with the bead 248 being located below the transition region of the end face 236 to the inner surface 240. The bead 248, as shown, extends radially inwardly from the inner surface 240 toward the axis 235 below the transition corner edge 246, such that the bead 248 is located between the second surface 244 and the opposite mounting end (not shown). Accordingly, with the bead 248 extending radially inwardly toward the axis 235 below the second surface 244, the bead 248, in its entirety, remains recessed below the plane P of the first surface 242. After molding, the inner core section 250A and a second inner core section 250B can be withdrawn away from one another along respective directions indicated by arrows A, B.

Figure 5:
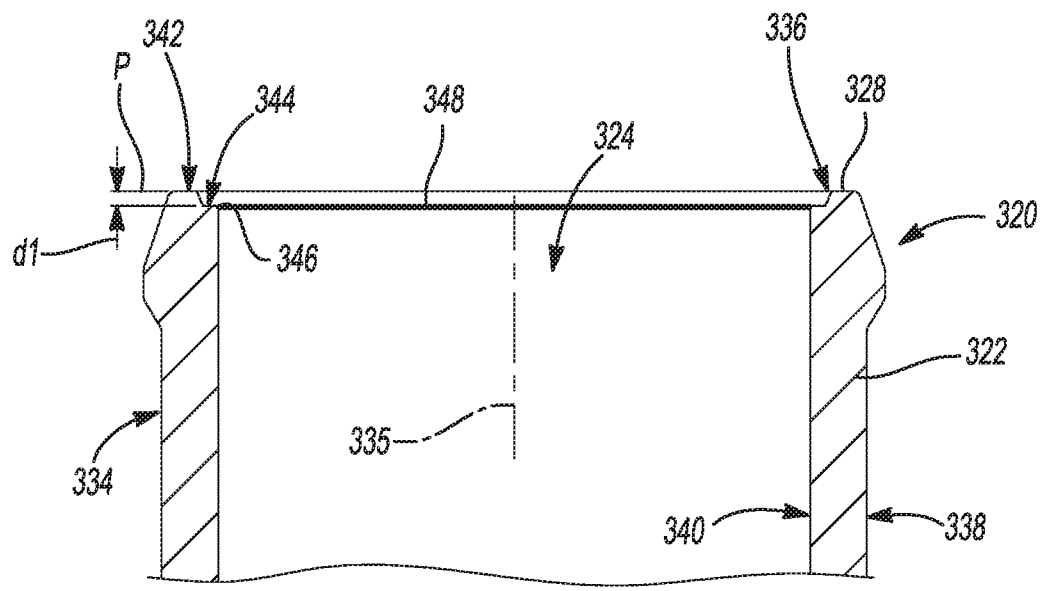
FIG. 5 is a cross-sectional fragmentary side view of a conduit connector constructed in accordance with yet another aspect of the disclosure.

In FIG. 5, a connector 320 constructed in accordance with another aspect of the disclosure is shown, wherein the same reference numerals as used above, offset by a factor of 300, are used to identify like features. The connector 320 includes a body 322 having a through passage 324 extending between opposite open ends (one shown, 328). The body 322 further provides a tubular male port section 334 extending axially along an axis 335 to an end face 336 opposite a mounting flange end (not shown, but the same or similar to that described for FIG. 2B). The tubular male port section 334 has an outer surface 338 configured for receipt of a tubular conduit thereabout and an inner surface 340 bounding at least a portion of the through passage 324. The end face 336 has at least two distinct annular sections, shown as having an annular first surface 342 extending radially inwardly directly from the outer surface 338 and an annular second surface 344 extending radially inwardly directly from the first surface 342 to the inner surface 340, such the that inner surface 340 transitions to the inner surface 340 at a corner edge 346. The annular second surface 344 is recessed axially a first distance (d1) from the annular first surface 342. In manufacture, an annular flashing bead, also referred to as protrusion or bead 348 is formed, with the bead 348 extending radially inwardly from the inner surface 340, wherein the bead 348 remains, in its entirety, recessed below a plane (P) defined by the planar or substantially planar first surface 342, thereby improving handling and pressure testing during assembly.

Figure 5A:
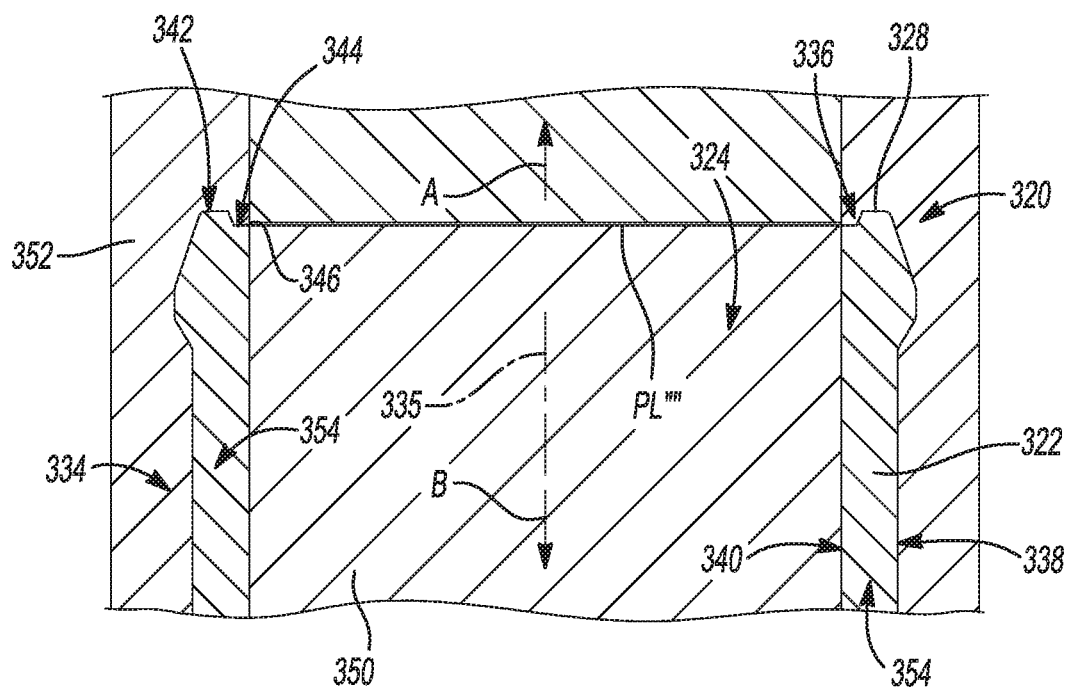
FIG. 5A is a cross-sectional fragmentary view illustrating a molding process and mold used to construct the conduit connector of FIG. 5.

In manufacture, as shown in FIG. 5A, an inner core 350 and an outer mold 352 together form a cavity 354 for receipt of molten material. The inner core 350 and outer mold 352 abut one another at a parting line PL'''' that extends radially in transverse relation to the axis 335 in coplanar or substantially coplanar relation with the second surface 344. The inner core 350 is shown as being cylindrical or substantially rod shaped to form the inner surface 340, while the outer mold is configured to form the shape of the outer surface 338 as well as the end face 336, including the annular first and second surfaces 342, 344. During molding, the molten material flows throughout the cavity 354 to form the desired shaped of the body 322, wherein flashing can be formed at the parting line PL'''' between the inner core 350 and outer mold 352. The flashing forms the annular bead 348, with the bead 348 being located at the transition region of the end face 336 to the inner surface 340 of the through passage 324. The bead 348, as shown, extends radially inwardly from the inner surface 340 adjacent or immediately adjacent the transition corner edge 346 toward the axis 335. Accordingly, with the bead 348 extending radially inwardly toward the axis 335 adjacent or below the second surface 344, the bead 348, in its entirety, remains recessed below the plane P of the first surface 342. After molding, the inner core 350 and outer mold 352 can be withdrawn away from one another along respective directions indicated by arrows A, B.

The foregoing description of the embodiments has been provided for purposes of illustration and description. It is not intended to be exhaustive or to limit the disclosure or claims. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure and claims, wherein the claims ultimately define the scope of the invention.

What is claimed is:

1. A conduit connector, comprising:
  a tubular body having a through passage extending inwardly between opposite open ends;
  a tubular male port section extending axially to an end face of one of said opposite ends and having an outer surface for receipt of a tubular conduit and an inner surface bounding at least a portion of said through passage;
  said end face extending radially from said outer surface to said inner surface and defining an annular first surface extending radially inwardly from said outer surface and an annular second surface extending radially inwardly from said annular first surface toward said inner surface;
  said annular second surface recessed axially a first distance from said annular first surface; and
  an annular bead of flashing that is entirely recessed below a plane defined by said annular first surface and disposed radially and axially inwardly from said annular first surface.

2. The conduit connector of claim 1, wherein said annular bead extends axially from said annular second surface a second distance, wherein said second distance is less than said first distance.

3. The conduit connector of claim 2, wherein said annular bead is immediately adjacent to said inner surface.

4. A conduit connector of claim 2, wherein said annular second surface defines a counterbore between said annular first surface and said inner surface.

5. A conduit connector of claim 2, wherein said outer surface of said tubular male port section defines at least one annular rib extending radially outwardly.

6. The conduit connector of claim 1, wherein said annular bead extends radially inwardly from said inner surface.

7. The conduit connector of claim 6, wherein said annular bead extends radially inwardly between said annular first and second surfaces.

8. The conduit connector of claim 6, wherein said annular bead extends radially inwardly from said inner surface and is disposed axially inwardly from said annular second surface.

9. The conduit connector of claim 1, wherein the first annular surface defines a first inner diameter and a first outer diameter and a first radial width therebetween, the second annular surface defines a second inner diameter and a second outer diameter and a second radial width therebetween, wherein the second radial width is less than the first radial width.

10. The conduit connector of claim 1, wherein the first annular surface and the second annular surface are planar and parallel.

11. The conduit connector of claim 1, wherein the inner surface has a continuous diameter extending axially from the second annular surface to the open end opposite the end face.

12. The conduit connector of claim 1, wherein the male port section includes an annular rib on the outer surface to facilitate retention of the tubular conduit in a leak-proof manner.

13. A method of constructing a conduit connector, comprising:
    forming a body having a through passage extending inwardly between opposite open ends and having a tubular male port section extending axially to an end face of one of said opposite ends;
    forming said tubular male port section having an outer surface extending radially outwardly for receipt of a tubular conduit and an inner surface bounding at least a portion of said through passage;
    forming one of said opposite ends having annular first surface extending radially inwardly from said outer surface;
    forming an annular second surface extending radially inwardly from said annular first surface toward said inner surface, said annular second surface forming a counterbore recessed axially a first distance from said annular first surface; and
    forming an annular bead of flashing that is entirely recessed below a plane defined by said annular first surface and disposed radially and axially inwardly from said annular first surface.

14. The method of claim 13, further including forming said annular bead extending axially from said second annular surface a second distance, said second distance being less than said first distance.

15. The method of claim 14, further including forming said annular bead immediately adjacent said inner surface.

16. The method of claim 13, further including forming said annular bead extending radially from said inner surface.

17. The method of claim 13, further including forming the body in a molding process.

18. The method of claim 17, further including forming the inner surface with an inner core including an upper core section and a lower core section, said upper and lower core sections being moveable axially away from one another.

19. The method of claim 17, further including forming the outer surface and the end face with an outer mold and forming the inner surface with at least one inner core, wherein said outer mold and said at least one inner core are moveable relative to one another.

20. The method of claim 17, further including forming a mount flange section opposite said annular surfaces.

* * * * *